J. W. MOYER.
Car Truck.
No. 6,975.
Patented Dec. 25, 1849.
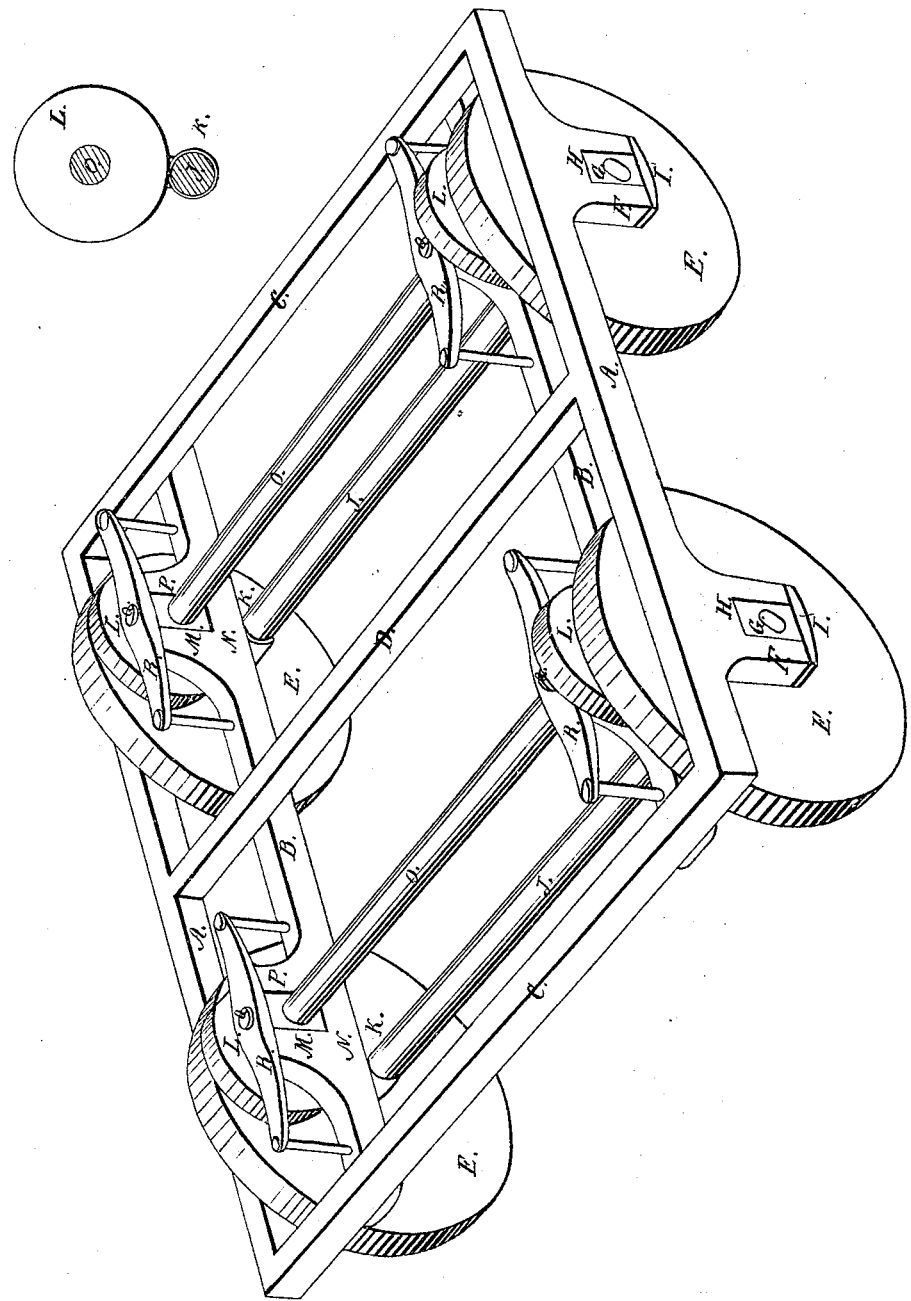

UNITED STATES PATENT OFFICE.

J. W. MOYER, OF UTICA, NEW YORK.

RAILROAD-TRUCK.

Specification of Letters Patent No. 6,975, dated December 25, 1849.

*To all whom it may concern:*

Be it known that I, J. W. MOYER, of Utica, in the county of Oneida and State of New York, have invented certain new and useful Improvements in Railroad-Trucks, and that the following is a full, clear, and exact description of the principle or character which distinguishes them from all other things before known and of the usual manner of making, modifying, and using the same, reference being had to the annexed drawing, which gives a perspective view of the entire running part of the vehicle.

Various attempts have been made to construct the trucks of rail road cars with friction wheels but they have either been complicated in their arrangement, unsubstantial in their construction or inefficient from their want of adaptation to the purposes for which they are required.

The object of my invention is to remove these difficulties and obtain a substantial truck embracing all the advantages of those now in common use and attaining the reduction of friction consequent upon the introduction of friction wheels in a permanent manner, and at a small cost. For this purpose I construct an ordinary truck with the usual pillar blocks and sliding boxes but instead of affixing the springs to said boxes I interpose friction wheels on an axle that extends from side to side over, and parallel with, the axle of the main wheels; these friction rollers or wheels bear upon the axle inside the main carrying wheels like the friction wheels used by W. Coles in his English patent but instead of these upper wheels bearing against the under part of the car as in that patent they are connected with the car and truck in the following way: Two rails B, which form a part of the truck frame and run parallel with the side pieces A; these rails pass between the axle of the friction wheels and that of the carrying wheels and above it are pillar blocks that sustain the sliding boxes of the upper or friction wheel axle, the boxes supporting this axle are connected with the frame by any of the ordinary springs and when they yield they allow these boxes and those of the main axle to play up and down while they are kept in place. In this particular they differ wholly from the devices above mentioned.

The following is a full and exact description of the construction and operation of the wheel by reference to the annexed drawing which gives a perspective view of the entire running part of the vehicle.

A, A, represents the outer longitudinal beams of the frame; B, B, inner beams parallel with the outer beams and between which and the outer beams the truck wheels with their corresponding friction wheels are situated; C, C, the outer cross beams of the frame; D, the center cross beam parallel with the outer cross beams of the frame; E, E, E, E, truck wheel; F, F, F, F, jaws in which the boxes of the truck wheels move up and down and which are attached to the outer longitudinal beams of the frame; G, G, sliding boxes in which the axles of the truck wheels revolve; H, H, open spaces in the jaws and above the boxes of the truck wheels; I, I, open spaces in the jaws below the boxes of the truck wheels; J, J, axles of the truck wheels; K, K, enlargement of the axles of truck wheels the uppermost edges of which come in contact with and press upward against the undermost edges of the friction wheels; L, L, L, L, friction wheels against which the enlargements K, K, of the axle of the truck wheels press in an upward direction; M, M, jaws in which the boxes of the friction wheels move up and down in conformity to the weight on the springs; N, N, sliding boxes in which the axles of the friction wheels revolve; O, O, axles of the friction wheels; P, P, open spaces in the jaws and above the boxes of the friction wheels; Q, Q, Q, Q, bolts attached firmly to the springs passing loosely through the inner longitudinal beam downward to the top of the sliding boxes of the friction wheels in such a manner as to leave an open space between these boxes and the beams; R, R, R, R, springs attached at each end to the top of the inner longitudinal beams and which sustain the whole weight of the load.

Having thus fully described my improvement what I claim therein as new and for which I desire to secure Letters Patent is—

The combination of the friction wheels and truck wheels with the truck frame substantially as herein described, in which I employ sliding boxes and connect the parts with springs while at the same time the axles are made to work steadily in union and produce the desired effect in a perfect manner.

J. W. MOYER.

Witnesses:
J. J. GREENOUGH,
WM. BISHOP.